United States Patent [19]

Iwai et al.

[11] Patent Number: 5,119,491
[45] Date of Patent: Jun. 2, 1992

[54] METHOD AND APPARATUS FOR FORMATTING DOCUMENT BY USING COMMAND CODES REGARDING DOCUMENT STRUCTURE

[75] Inventors: Iwamu Iwai, Kawasaki; Mika Fukui, Yokohama; Yoichi Takebayashi, Yokohama; Koji Yamaguchi, Yokohama; Miwako Doi, Kawasaki, all of Japan

[73] Assignee: Kabushiki Kaisha Toshiba, Kawasaki, Japan

[21] Appl. No.: 309,128

[22] Filed: Feb. 13, 1989

[30] Foreign Application Priority Data

Feb. 12, 1988 [JP] Japan .................. 63-28789

[51] Int. Cl.⁵ .......................................... G06F 7/06
[52] U.S. Cl. .......................... 395/600; 364/239.3; 364/225.6; 364/225.3; 364/225; 364/DIG. 2; 364/419
[58] Field of Search ... 364/200 MS File, 900 MS File, 364/419, 518, 521; 400/76, 120, 279, 284

[56] References Cited

U.S. PATENT DOCUMENTS

| | | | |
|---|---|---|---|
| 4,028,681 | 6/1977 | Vittorelli | 364/900 |
| 4,539,653 | 9/1985 | Bartlett | 364/900 |
| 4,633,430 | 12/1986 | Cooper | 364/900 |
| 4,675,844 | 6/1987 | Yasuda | 364/900 |
| 4,723,209 | 2/1988 | Hernandez et al. | 364/300 |
| 4,751,740 | 6/1988 | Wright | 364/900 |
| 4,773,009 | 9/1988 | Kucera et al. | 364/419 |
| 4,796,196 | 1/1989 | Durst, Jr. et al. | 364/478 |
| 4,881,197 | 11/1989 | Fischer | 364/900 |
| 4,980,840 | 12/1990 | Yin | 340/730 |

FOREIGN PATENT DOCUMENTS 0163503 12/1985 European Pat. Off. .
0241646 10/1987 European Pat. Off. .
0242857 10/1987 European Pat. Off. .

OTHER PUBLICATIONS

J. Gutknecht, "Concepts of the Text Editor Lara", 8070 Communications of the Association of Computing Machinery, 28(1985)Sep., No. 9, New York, USA, pp. 942-960.

Furuta et al., "Document Formatting Systems: Survey, Concepts, and Issues"; Computing Surveys, vol. 14, No. 3, Sep. 1982, pp. 439-445.

Primary Examiner—Thomas C. Lee
Assistant Examiner—Eric Coleman
Attorney, Agent, or Firm—Foley & Lardner

[57] ABSTRACT

A method and an apparatus for formatting a document containing command codes indicating prescribed commands concerning a structural function, which are simply manipulatable as well as consistently correct. The method includes the steps of: structurally analyzing the document and deriving structural information from the document; detecting command codes and adjusting the analysis in accordance with the indications of the command codes; and formatting the document in accordance with the structural information. An apparatus for carrying out the method is also disclosed.

6 Claims, 7 Drawing Sheets

FIG.2
TABLE I

0) COMMAND CODE BEGINS WITH

1) LOGICAL STRUCTURE CODE

| COMMAND CODES | LOGICAL ATTRIBUTES |
|---|---|
| ⬭ DATE | DATE |
| ⬭ NODC | DOCUMENT NUMBER |
| ⬭ TTDC | TITLE |
| ⬭ AUTH | AUTHOR |
| ⬭ SECT | MEMBERSHIP |
| ⬭ ADDR | ADDRESS |
| ⬭ ABCT | ABSTRACT |
| ⬭ HEAD | HEADER |
| ⬭ PARA | PARAGRAPH |
| ⬭ BIBL | BIBLIOGRAPHY |
| ⬭ APPE | APPENDIX |
| ⬭ TOAD | FORWARD ADDRESS |
| ⬭ FRAD | RETURN ADDRESS |

2) ANALYSIS PROHIBITION CODE

⬭ X ----- ANALYSIS PROHIBITION START LINE CODE
⬭ Y ----- ANALYSIS PROHIBITION END LINE CODE

3) GRAPHIC REFERENCE CODE

⬭ S ----- REFERENCE START POINT CODE
⬭ ZF ----- REFERRED FILE CODE
⬭ ZP ----- REFERRED GRAPHIC LAYOUT CODE
⬭ E ----- REFERENCE END POINT CODE

4) COMPULSORY RETURN CODE

⬭ C ----- COMPULSORY RETURN CODE

FIG. 3
TABLE II

| SENTENCE NO. | ATTRIBUTE | LEVEL | HEADER PATTERN |
|---|---|---|---|
| 1 | Section Header | 1 | [NUMERAL]+[PERIOD]+[ITSELF] |
| 2 | Null | Null | Null |
| 3 | Paragraph | 2 | [NUMERAL]+[PERIOD]+[NUMERAL.(GENERAL)]<br>+[ITSELF] |
| 4 | Paragraph End | 3 | Null |
| · | | | |
| · | | | |
| 7 | Paragraph End | 3 | Null |
| 8 | Example | 4 | Null |
| · | | | |
| · | | | |
| 15 | Section Header | 1 | [NUMERAL]+[PERIOD]+[ITSELF] |
| 16 | Section End | 2 | Null |

| LINE NO. | |
|---|---|
| 1 --- | INTELLIGENT DOCUMENT PROCESSING SYSTEM |
| 2 --- | ⊖AUTH    RACHI YOZAN |
| 3 --- | ⊖SECT    NICHIBEI SOFTWARE |
| 4 --- | |
| 5 --- | 1. INTRODUCTION |

Recently,appearances of the multi-functional Japanese word-processor and the desk-top publishing made it possible to deal with ------
------------------

2. LOGICAL STRUCTURE EXTRACTION METHOD
    Our intelligent document processing system uses the logical structure extraction method indicated by 33 ---    ⊖S Fig.10⊖ZF bunsho-1⊖ZP d⊖E.--------
--------------------

FIG.6(A) TABLE III

| SENTENCE NO. | ATTRIBUTE | LEVEL | HEADER PATTERN |
|---|---|---|---|
| 1 | Title | 1 | [ITSELF] |
| 2 | Sub Title | 1 | [ITSELF] |
| 3 | Sub Title | 1 | [ITSELF] |
| 4 | Null | Null | Null |
| 5 | Section Header | 1 | [NUMERAL]+[PERIOD]+[RESERVED WORD] |
| 6 | Section End | 2 | Null |
| 7 | Null | Null | Null |
| 8 | Section Header | 1 | [NUMERAL]+[PERIOD]+[ITSELF] |
| 9 | Section End | 2 | Null |
| ...... | ...... | ...... | ...... |

FIG.6(B) TABLE IV

| SENTENCE NO. | ATTRIBUTE | LEVEL | HEADER PATTERN |
|---|---|---|---|
| 1 | Title | 1 | [ITSELF] |
| 2 | Author | 1 | [ITSELF] |
| 3 | Section | 1 | [ITSELF] |
| 4 | Null | Null | Null |
| 5 | Section Header | 1 | [NUMERAL]+[PERIOD]+[RESERVED WORD] |
| 6 | Section End | 2 | Null |
| 7 | Null | Null | Null |
| 8 | Section Header | 1 | [NUMERAL]+[PERIOD]+[ITSELF] |
| 9 | Section End | 2 | Null |
| ...... | ...... | ...... | ...... |

FIG.7

By the above transforming operation, the equations:

⊂⊃X $ax_i + bx_i$ $= ax_i + (qa+c)x_i \qquad b = qa + c \ (0 \leq c < a)$ $= a(x_i + qx_i) + cx_i$ $= ax_k + cx_i \qquad (x_k = x_i + qx_i)$

⊂⊃Y can be obtained  ⊂⊃ C

METHOD AND APPARATUS FOR FORMATTING DOCUMENT BY USING COMMAND CODES REGARDING DOCUMENT STRUCTURE

BACKGROUND OF THE INVENTION

1. Field of the Invention

The present invention relates to a method and an apparatus for formatting a document in accordance with the structure of the document.

2. Description of the Background Art

Recently, there has been remarkable progress in so-called desk-top publishing as well as in Japanese word-processors, in addition to the advances in the output devices such as displays and printers which make it possible to produce documents in much more diverse and effective styles.

However, producing documents which are both neat-looking and easily-readable requires thorough understanding of operations, commands and formats of a document formatting apparatus to be used, which makes such a document formatting apparatus almost inaccessible to those without formal training.

As a solution to this situation, progress has been made in developing an automatic document formatting system which utilizes an automatically extracted logical structure of a document, along with a document formatting system capable of arranging figures and articles according to automatically derived referential relationships between figures and articles.

Although such logical structures and referential relationships are generally sufficient to provides structural information on the document necessary for effective formatting, ambiguities involved in human languages may lead to misapprehension of the logical structures and referential relationships. Furthermore, apart from this problem, outputs of such automatic document formatting apparatus may not satisfy personal or temporal demands of a user.

On the other hand, there are document formatting systems which utilize command codes indicating the manner of formatting to be embedded in the document, such as 'Roff'. More recently, there appeared document formatting systems such as 'Scribe' or 'T$_E$X' which use document data and format data independently so a change in command codes can be made at once on the format data, without looking for every embedded command code as in 'Roff'. Moreover, 'Scribe' and 'T$_E$X' are capable of performing more sophisticated formatting than others. But, in these document formatting systems, a thorough understanding of command codes is indispensable for skillful maneuvering. Furthermore, even in 'Scribe' and 'T$_E$X', embedding of command codes is necessary which can easily be tedious. Although automatic document formatting apparatuses mentioned above are free of such problems concerning command codes, they are, as described above, prone to misapprehension of the logical structures and referential relationships due to the ambiguities in the human languages, and the outputs of such automatic document formatting apparatus may not satisfy personal or temporal demands of a user.

Thus, with conventional document formatting apparatuses, either a possibility of misapprehension resulting from automatic extraction of document structures or else difficulties in dealing with command codes which need to be embedded in the document and thoroughly mastered by the user, have to be tolerated.

SUMMARY OF THE INVENTION

It is therefore an object of the present invention to provide a method and an apparatus for formatting a document which are simply manipulatable as well as consistently correct.

According to one aspect of the present invention, there is provided an apparatus for formatting a document which contains command codes indicating prescribed commands concerning structural function, comprising: a unit for entering the document in to the apparatus; a unit for structurally analyzing the document and deriving structural information from the document; a unit for detecting the command codes and adjusting the analysis by the structurally analyzing a unit in accordance with the indications of the command codes; and a unit for carrying out formatting of the document in accordance with the structural information.

According to another aspect of the invention, there is provided a method of formatting a document which contains command codes indicating prescribed commands concerning structural functions, comprising the steps of: structurally analyzing the document and deriving structural information from the document; detecting the command codes and adjusting the analysis at the structurally analyzing step in accordance with the indications of the command codes; and formatting the document in accordance with the structural information.

Other features and advantages of the present invention will become apparent from the following description taken in conjunction with the accompanying drawings.

DETAILED DESCRIPTION OF THE PREFERRED EMBODIMENTS

Figure 1:
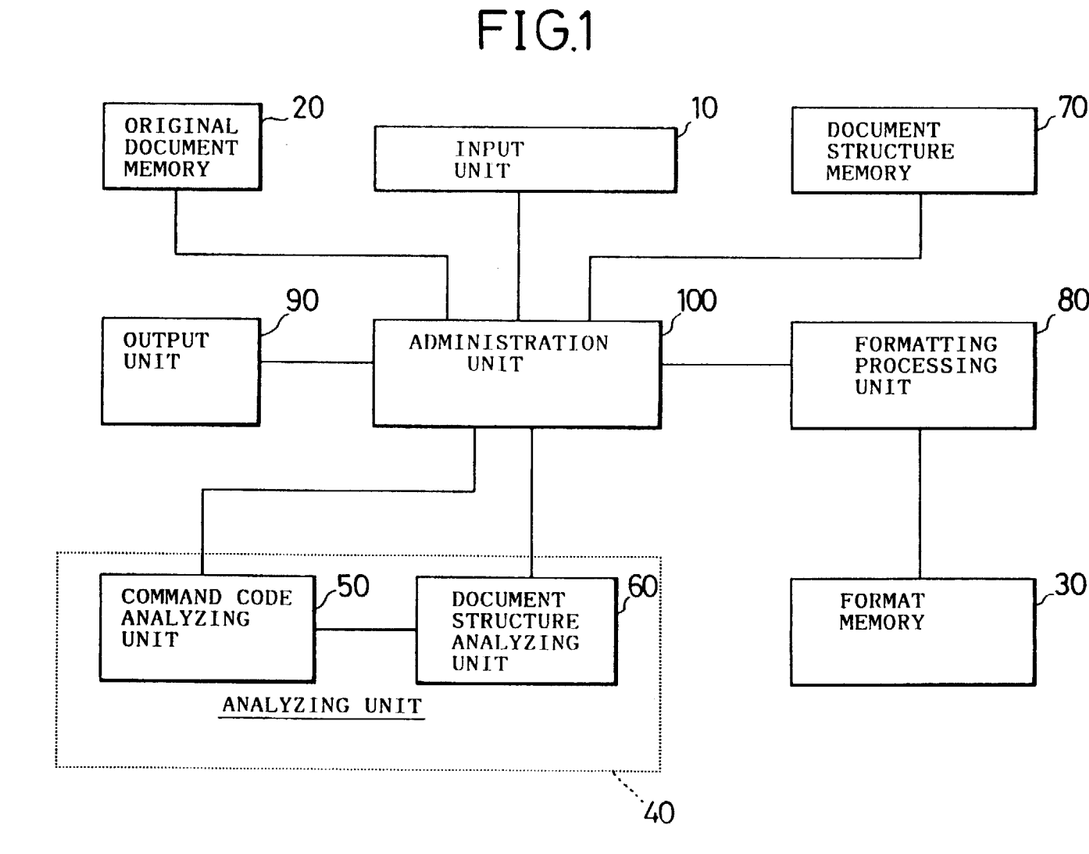
FIG. 1 is a block diagram of a document formatting apparatus according to one embodiment of the present invention.

Referring now to FIG. 1, there is shown one embodiment of a document formatting apparatus according to the present invention.

This document formatting apparatus comprises an input unit 10 from which a document to be formatted with command codes embedded is entered, an original document memory 20 for storing the document with the command codes entered at the input unit 10, a format memory 30 for storing a format into which the document is to be formatted, an analyzing unit 40 comprising a command code analyzing unit 50 for analyzing contents of the command codes, and a document structure analyzing unit 60 for analyzing logical and referential structures of the document in accordance with the analyzed contents of the command codes, a document structure memory 70 for storing the analyzed structures of the document, a formatting processing unit 80 for carrying out formatting in accordance with the structures of the document stored in the document structure memory 70 and the format stored in the format memory 30, an output unit 90 for presenting the document as formatted by the formatting processing unit 80, and an administration unit 100 for administerring the operations by all these parts of this document formatting apparatus mentioned above.

The input unit 10 may take a form of a keyboard, a mouse, or a communication network. The output unit 90 may take a form of a CRT, a display, or a printer.

In the analyzing unit 40, when the command codes are present in the document, the command code analyzing unit 50 adjusts operation of the document structure analyzing unit 60 such that the contents of the command codes are reflected in the manner of analyzing the logical and referential structures of the document. Thus, in this embodiment a user can deliberately control the analysis of the logical and referential structures. Moreover, the command code analyzing unit 50 also deciphers those command codes which are directly concerned with the layout of the document, so that the user can also have control over the layout of the document.

Figure 2:
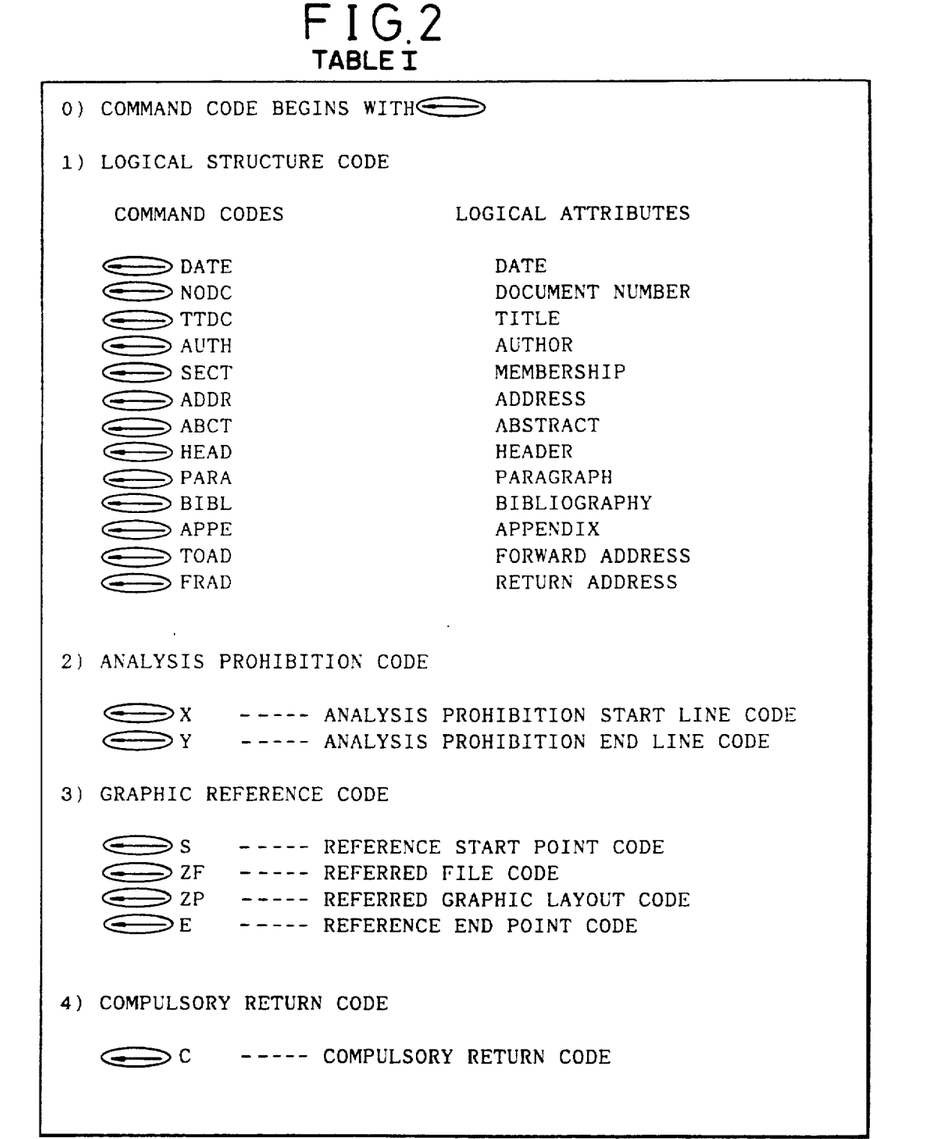
FIG. 2 is a tabulated illustration of examples of command codes to be utilized in the document formatting apparatus shown in FIG. 1.

An example of a set of command codes to be utilized in this embodiment are shown in TABLE I. of FIG. 2. As given in the section (0) of FIG. 2, any command code begins with a symbol ⊖ in this embodiment, and what follows this symbol ⊖ designates a type of command code. Various different types of command codes and their corresponding logical attributes are summarized in the section (1) of FIG. 2. For example, a command code ⊖DATE indicates that what follows is the date, a command code ⊖NODC indicates what follows is the document number, and so on. In addition, there are analysis prohibition codes shown in the section (2) of FIG. 2 which indicate a portion of the document not to be structurally analyzed such as those containing mathematical formulae and those requiring a special type of formatting. Furthermore, there are graphic reference codes as shown in the section (3) of FIG. 2 which indicate the presence of a reference in the document to graphics, as well as the location of data on the graphics being referred to and the layout of the graphics, i.e., how the graphics are to be incorporated into the final output of the document. There is also a compulsory return code shown in the section (4) of FIG. 2 which indicates forcible changing to the next line, regardless of the logical structure.

Figure 3:
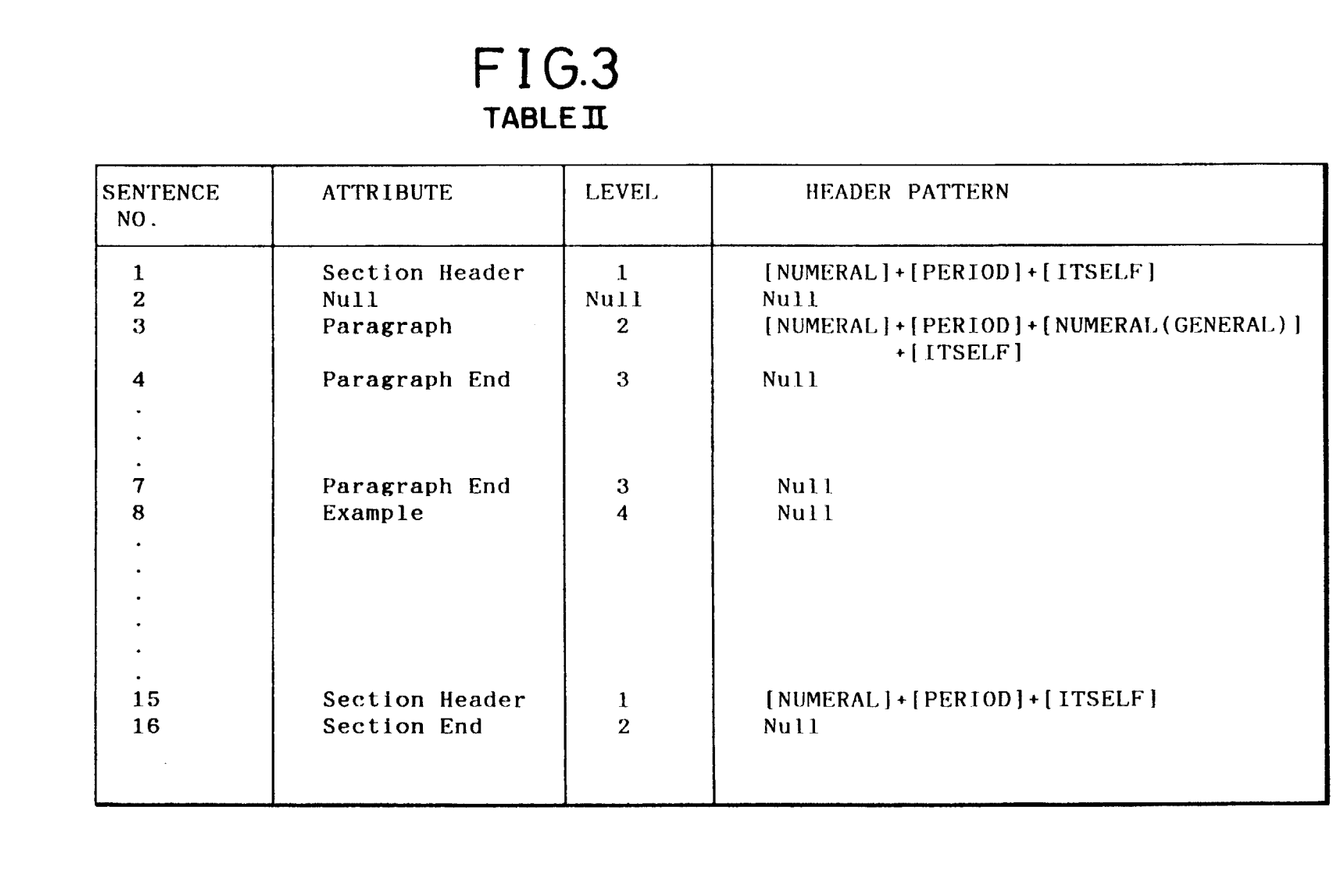
FIG. 3 is another tabulated illustration of logical structures to be utilized in the document formatting apparatus shown in FIG. 1.

An example of the logical structure in the document structure memory 70 is shown in TABLE II. of FIG. 3. The logical structure in the document structure memory 70 comprises a sentence number labelling each sentence of the document, an attribute for each sentence, a level given to each attribute, and a header pattern for relevant sentences. For example, in FIG. 3 a sentence labelled by the sentence number 4 is given an attribute of Paragraph End in response to the command code ⊖HEAD present in that sentence, whose level is given as 3 and which has no header pattern. Such a logical structure will be utilized along with the format data in the format memory 30 in carrying out formatting of the document.

Figure 4:
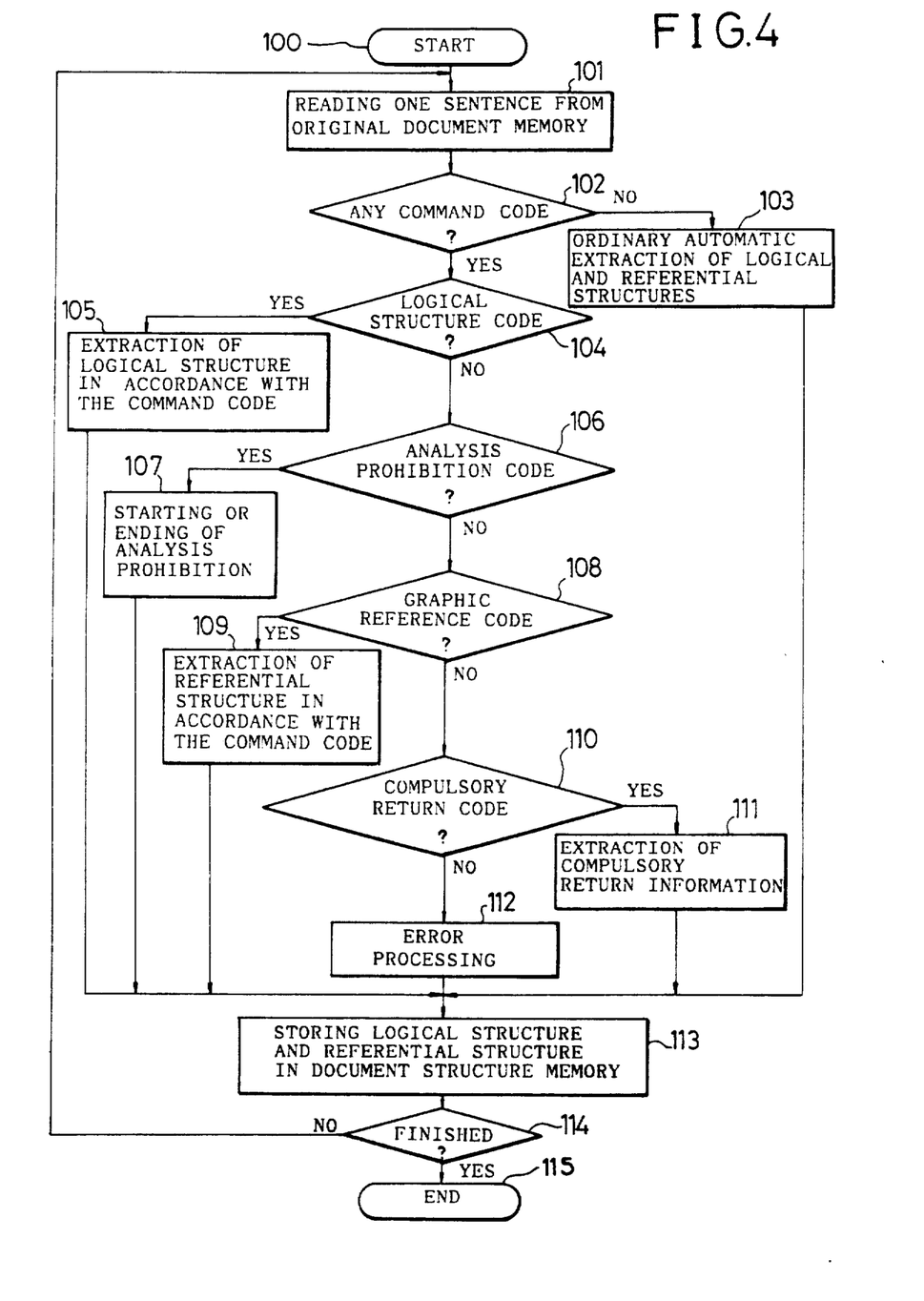
FIG. 4 is a flow chart for the operation of formatting by the document formatting apparatus shown in FIG. 1.

Referring now to FIG. 4, the operation of document formatting by this document formatting apparatus will be described.

At the step 100, the document with the command codes is entered from the input unit 10 and stored in the original document memory 20.

Then, one sentence of the document is read out from the original document memory 20 and provided to the analyzing unit 40 at the step 101.

Then at the step 102, whether there is any command code in this sentence is determined by the command code analyzing unit 50.

When there is no command code in the sentence, an ordinary automatic extraction of logical and referential structures of the document is carried out by the document structure analyzing unit 60 at the step 103 and the process proceeds to the step 113 to be explained below.

On the other hand, when there is a command code in the sentence, the step 104 will be taken in which whether the command code present in the sentence is one of the logical structure codes is determined by the command code analyzing unit 50.

When the command code is one of the logical structure codes, the logical structure of the sentence is extracted by the document structure analyzing unit 60 at the step 105 in accordance with what the command code indicates and the process proceeds to the step 113.

Otherwise, the step 106 will be taken in which whether the command code present in the sentence is one of the analysis prohibition codes is determined by the command code analyzing unit 50.

When the command code is one of the analysis prohibition codes, the structural analysis by the document structure analyzing unit 60 is controlled at the step 107 in accordance with what the command code indicates and the process proceeds to the step 113.

Otherwise, the step 108 will be taken in which whether the command code present in the sentence is one of the graphic reference codes is determined by the command code analyzing unit 50.

When the command code is one of the graphic reference codes, the referential structure of the sentence is extracted by the document structure analyzing unit 60 at the step 109 in accordance with what the command code indicates and the process proceeds to the step 113.

Otherwise, the step 110 will be taken in which whether the command code present in the sentence is the compulsory return code is determined by the command code analyzing unit 50.

When the command code is the compulsory return code, the information of the compulsory return is deciphered and extracted by the command code analyzing unit 50 at the step 111 and the process proceeds to the step 113.

Otherwise, the command code present in the sentence is in error since it is not any one of command codes given in FIG. 2, so at the step 112 the error in the command code is corrected, and the process proceeds to the step 113.

At the step 113, the result of the logical and referential structures obtained up to this point is stored in the document structure memory 70.

Then at the step 114, whether all the sentences in the document have been checked is determined. When all the sentences in the document have not been checked, the process returns to the step 101 and the steps following will be repeated.

Otherwise the process proceeds to the step 115, at which the formatting of the document is carried out by the formatting processing unit 80 in accordance with the logical and referential structures stored in the document structure memory 70 as well as with the format stored in the format memory 30, and as the resulting formatted document is outputted by the output unit 90 the process terminates.

Figure 5:
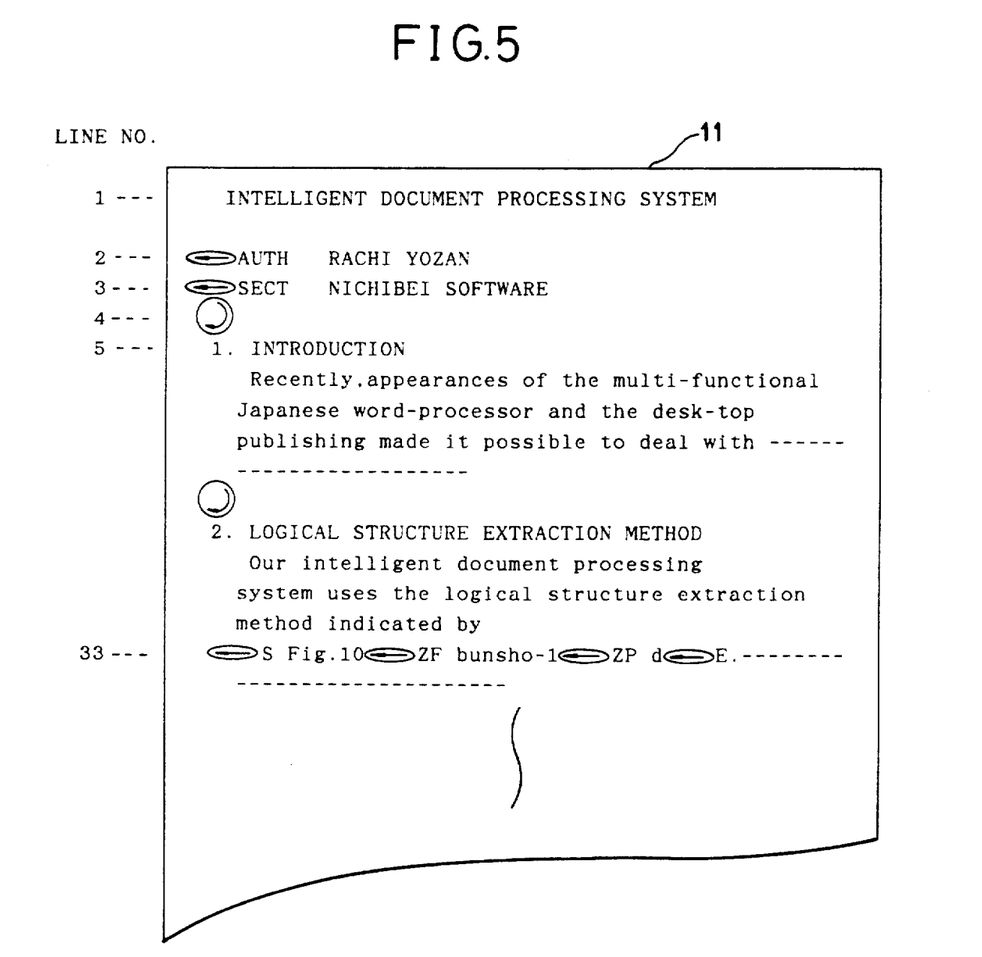
FIG. 5 is an illustration of a document being formatted by the document formatting apparatus shown in FIG. 1, showing the manner in which the command codes are used in this embodiment.

One practical example of the document and the use of the command codes is shown in FIG. 5.

In this example of FIG. 5 which is a report 11 entitled 'Intelligent document processing system', the first line "INTELLIGENT DOCUMENT PROCESSING SYSTEM" can be identified as a title by the ordinary automatic logical structure extraction so that no command code is necessary in this first line. On the other hand, the second line "RACHI YOZAN" will most likely not be identifiable as the name of the author as Rachi Yozan is a very rare name so that this name cannot be found in a name data-base. Thus, that "RACHI YOZAN" is a name of the author is indicated by placing the command code ⊖AUTH at the top of this second line. Accordingly, the document structure analyzing unit 60 can construe "RACHI YOZAN" as the name of the author correctly. Likewise, "NICHIBEI SOFTWARE" in the third line can be identified correctly as the name of the organization to which the author belongs by placing the command code ⊖SECT at the top of this third line. As for the fourth line, there is a compulsory return code at the top of this fourth line, as this fourth line is to be left blank. The fifth line "1. INTRODUCTION" can be identified as a section header with 'introduction' as a reserved word, by ordinary automatic logical structure extraction so that no command code is necessary in this fifth line. Also, the thirty-third line "⊖S FIG. 10⊖ZF bunsho-1⊖ZP d⊖E ..." means that "FIG. 10 is in the file 'bunsho-1' and it is to be laid out in the lower part of the current page ...".

Figure 6A:
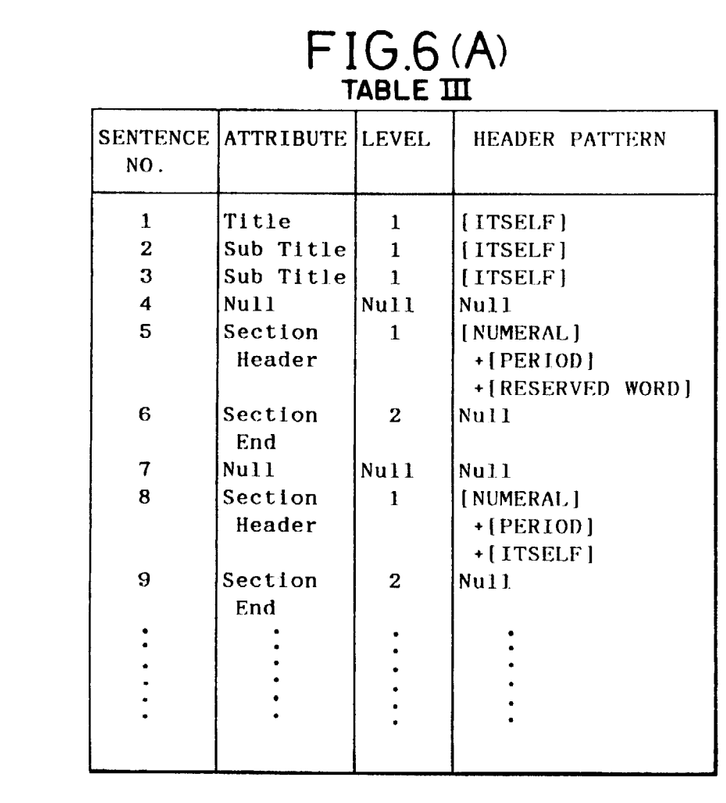
FIGS. 6(A) and (B) are tabulated illustrations of logical structures for the document shown in FIG. 5, obtained without and with the command codes.
Figure 6B:
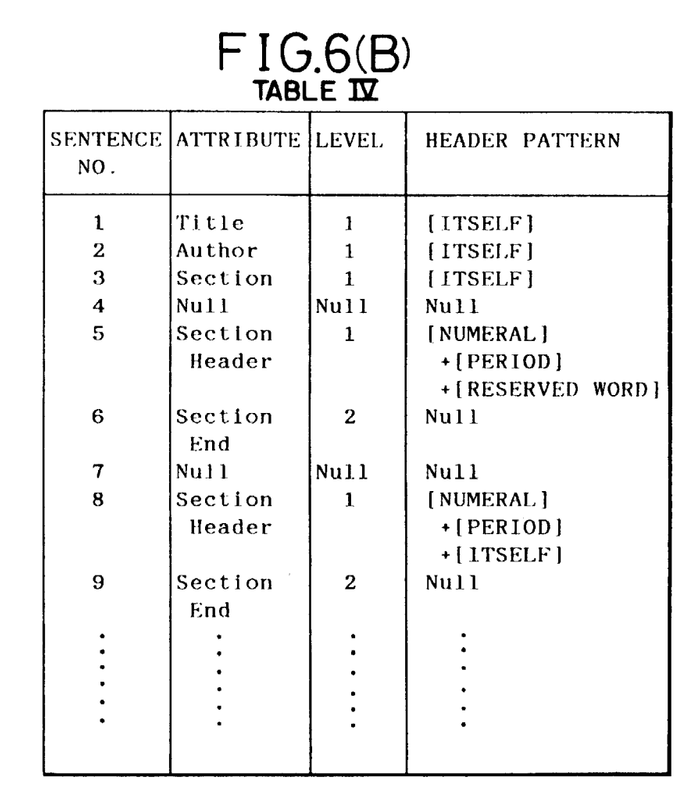

How the logical structure obtained by the document structure analyzing unit 60 is affected by the presence of the command codes in the example of FIG. 5 is shown in FIGS. 6(A) and (B), where TABLE III. of FIG. 6(A) shows the logical structure obtained from the document without the command codes and TABLE IV. of FIG. 6(B) shows the logical structure obtained from the document with the command codes. As can be seen from FIG. 6, without the command codes, i.e., by a completely automatic logical structure extraction, the second and the third lines are construed incorrectly as sub-titles in FIG. 6(A), whereas with the use of the command codes this misapprehension can be avoided in FIG. 6(B).

Figure 7:
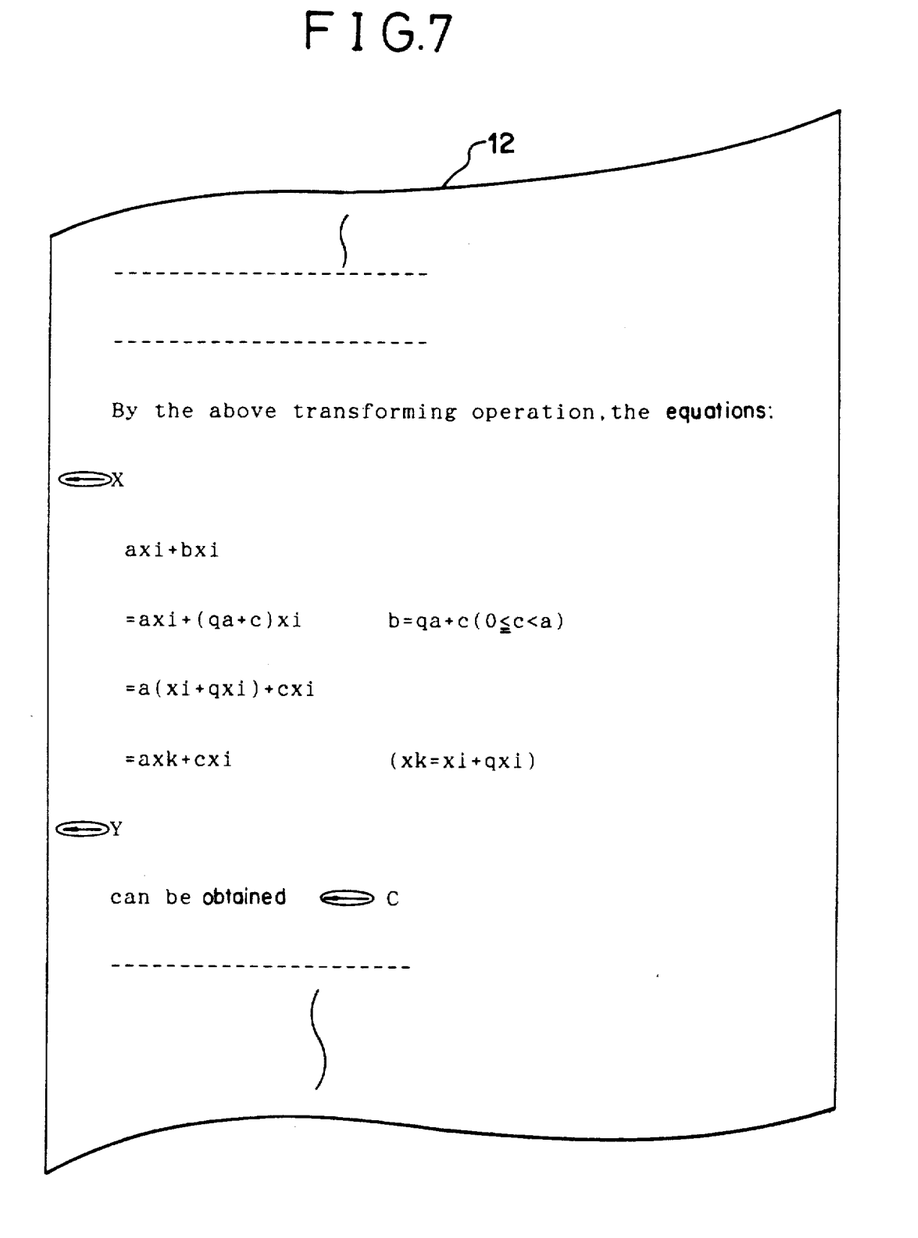
FIG. 7 is another illustration of a document being formatted by the document formatting apparatus shown in FIG. 1, showing the manner in which the command codes are used in this embodiment.

Another practical example of the document and the use of the command codes, in particular the use of the analysis prohibition codes, is shown in FIG. 7.

In this example of FIG. 7 which is a portion of an article 12 containing mathematical formulae, the analysis prohibition start line code⊖X and the analysis prohibition end line code⊖Y are placed at the top and the bottom, respectively, of the mathematical formulae so that this portion will not be structurally analyzed, as the meaning of the mathematical formulae is not analyzable by the document structure analyzing unit 60. Apart from the mathematical formulae, the analysis prohibition codes can similarly be used for those portions which are written in a special or personal manner. In addition, the compulsory return code⊖C can be placed in a middle of a line as shown in FIG. 7.

As described, according to this embodiment it is possible to have a document formatting apparatus which is both simply manipulatable and consistently correct. It can be seen from the above description that this is due to the particular use of both the automatic logical and referential structures, and the command codes. Consequently, according to this embodiment the misapprehension inevitably accompanying the completely automatic structural analysis can be rectified by the use of the command codes. At the same time, as this embodiment requires the use of the command code in only those places which may causes misapprehension, and not elsewhere, the encumbrances associated with the conventional usage of the command codes can be lessened enormously.

It is to be noted that although in the above embodiment, the command codes are placed at the top of lines, this can easily be modified to allow placement of the command code anywhere in the lines.

Also, although in the above embodiment the only command code which is directly concerned with the layout of the document is the compulsory return code, it is possible to incorporate more complicated command codes such as font command codes and style command codes used in 'Scribe', thereby enhancing the scope of possible formatting.

Also, although in the above embodiment the structural analysis is performed line by line, this can be performed in so-called Top-Down fashion, i.e., the entire document all at once.

Moreover, the analysis prohibition codes ⊖X and ⊖Y can be modified such that within a portion indicated by them the analysis is to be performed by a particular processing system such as T$_E$X which is known to be highly effective in dealing with mathematical formulae.

Furthermore, this embodiment can be effectively employed not only for a document containing references to graphics as in the examples in the foregoing description, but also for a document having references to a list of references or bibliography, and for relational data-bases.

Besides these, many modifications and variations of the above embodiment may be made without departing from the novel and advantageous features of the present invention. Accordingly, all such modifications and variations are intended to be included within the scope of the appended claims.

What is claimed is:

1. An apparatus for formatting a document which contains command codes indicating prescribed commands concerning structural functions, comprising:
    means for entering said document into said apparatus;
    means for analyzing a structure, including at least a logical structure, of said document and deriving structural information from said document by automatically carrying out prescribed routine analysis of said document and derivation of said structural information for portions of said document without said command codes;
    means for detecting said command codes and adjusting said structural information derived by automatically carrying out said prescribed routine analysis by said analyzing means by using indications of said command codes; and means for carrying out formatting of said document by using said structural information as adjusted by said detecting and adjusting means.

2. The apparatus of claim 1, wherein said analyzing means analyzes a referential structure of said document, said referential structure regarding referencing relationships among different parts of said document.

3. The apparatus of claim 1, wherein said command codes also indicate prescribed commands concerning format, and wherein said means for carrying out formatting carries out said formatting by also using said commands concerning format indicated by said command codes.

4. A computer implemented method of formatting a document which contains command codes indicating prescribed commands concerning structural functions comprising the computer implemented steps of:

analyzing a structure including at least a logical structure of said document and deriving structural information from said document by automatically carrying out prescribed routine analysis of said document and derivation of said structural information for portions of said document without said command codes;

detecting said command codes and adjusting said structural information derived by automatically carrying out said prescribed routine analysis at said analyzing step by using indications of said command codes; and formatting said document by using said command codes and said structural information as adjusted at said detecting and adjusting step.

5. The method of claim 4, wherein at said analyzing step a referential structure of said document regarding referencing relationships among different parts of said document is analyzed.

6. The method of claim 4, wherein said command codes also indicate prescribed commands concerning format, and wherein at said formatting step formatting is carried out by also using said commands concerning format indicated by said command codes.

* * * * *